United States Patent
Lin et al.

(10) Patent No.: US 8,074,279 B1
(45) Date of Patent: Dec. 6, 2011

(54) DETECTING ROGUE ACCESS POINTS IN A COMPUTER NETWORK

(75) Inventors: Ching Lung Lin, Keelung (TW); Tzu Hao Chen, Taipei (TW)

(73) Assignee: Trend Micro, Inc., Tokyo (JP)

( * ) Notice: Subject to any disclaimer, the term of this patent is extended or adjusted under 35 U.S.C. 154(b) by 990 days.

(21) Appl. No.: 11/966,412

(22) Filed: Dec. 28, 2007

(51) Int. Cl.
*G06F 11/00* (2006.01)
*G06F 1/26* (2006.01)

(52) U.S. Cl. ............ 726/23; 713/153; 713/166; 726/34; 709/243

(58) Field of Classification Search .................... 726/23; 380/270

See application file for complete search history.

(56) References Cited

U.S. PATENT DOCUMENTS

| | | | |
|---|---|---|---|
| 7,457,965 B2* | 11/2008 | Tamura et al. | 713/182 |
| 2005/0060576 A1* | 3/2005 | Kime et al. | 713/201 |
| 2005/0195753 A1* | 9/2005 | Chaskar et al. | 370/254 |
| 2007/0022195 A1* | 1/2007 | Kawano et al. | 709/225 |
| 2009/0094357 A1* | 4/2009 | Keohane et al. | 709/224 |

OTHER PUBLICATIONS

"Passive Detection of NAT Routers and Client Counting" by Kenneth Straka and Gavin Manes; International Federation for Information Processing, vol. 222, 2006.*
"RIPPS: Rogue Identifying Packet Payload Slicer Detecting Unauthorized Wireless Hosts Through Network Traffic Conditioning" by Chad et al., ACM Journal Name, May 2007.*
"All-Optical Decrementing of a Packet's Time-to-Live (TTL) Field and subsequent dropping of a Zero-TTL packet" by McGeehan et al., Journal of Lightware Technology, Nov. 2003.*

* cited by examiner

*Primary Examiner* — Taghi Arani
*Assistant Examiner* — Mohammad Rahman
(74) *Attorney, Agent, or Firm* — Beyer Law Group LLP

(57) ABSTRACT

Detecting an unauthorized wireless access point in a network uses a detector. A rogue access point detector receives an incoming data packet which is scanned for a time expiration value. The time expiration value may be a Time To Live (TTL) value as used in Internet Protocol data packet headers. It is determined whether the time expiration value is the same as a threshold time expiration value. If the time expiration value is not the same as the threshold value, it is determined whether the incoming data packet was routed through an authorized access point in the network. If it is determined that the packet is not being routed from an authorized access point, a security component in the network, such as a network administrator's workstation, is notified. During this process the time expiration value remains unchanged.

12 Claims, 6 Drawing Sheets

United States Patent

DETECTING ROGUE ACCESS POINTS IN A COMPUTER NETWORK

BACKGROUND OF THE INVENTION

1. Field of the Invention

The present invention relates to computer network security. More specifically, it relates to software and network systems for detecting rogue or unauthorized network access points in computer networks.

2. Description of the Related Art

Computer networks have become increasingly vulnerable to attack from external and internal entities acting maliciously or in some unauthorized manner. The ease with which users can now log onto wireless networks and the flexibility offered to these users have not come without drawbacks, particularly with regard to security and data integrity. This is especially true with computer networks that allow for wireless connections. For example, unauthorized individuals may "tap" into an internal network, such as one in a company or government agency, and access data, communicate with other nodes in the network, and perform other activities, by using what are referred to as "rogue" or unauthorized access points in a network. An access point is a physical component in a network that enable connections in a network where an authorized component, typically a laptop making a wireless connection, gains access to the network. In many cases, wireless access points to a network are not protected and can be accessed without having to use a password or user account.

Presently, the primary method of detecting rogue access points involves using a radio receiver or radio wave detector. System administrators or security personnel, for example, physically walk through offices, hallways, and other areas of the physical structure containing the network with a radio receiver and check for radio waves. This is not a computer-implemented method nor is it automated in any manner. Furthermore, it is expensive, time-consuming, may not always be reliable, and clearly does not integrate well with computer-based network security techniques and components.

SUMMARY OF THE INVENTION

One embodiment of the present invention a method of detecting an unauthorized wireless access point in a network is described. An incoming data packet is scanned for a time expiration value. In one embodiment, the time expiration value may be a Time To Live (TTL) value as used in Internet Protocol data packet headers. It is determined whether the time expiration value is the same as a threshold time expiration value, also referred to as a maximum time expiration value. If the time expiration value is not the same as the threshold value, it is determined whether the incoming data packet was routed through an authorized access point in the network. If it is determined that the packet is not being routed from an authorized access point, a security component in the network, such as a network administrator's workstation, is notified. During this process the time expiration value remains unchanged.

Another embodiment of the present invention is a wireless access point detection component. The component contains a processor, an incoming network interface and an outgoing network interface, a time expiration data analysis module, and a packet scan module for scanning an incoming data packet for a time expiration value. The component also has a memory storing an authorized wireless access point data set. The time expiration data analysis module determines a maximum time expiration value for data packets originating from end user devices in a network. The authorized access point data set is used to determine whether an access point is authorized. In one embodiment, the data set contains IP addresses of authorized access points in the network.

Another embodiment is a computer network having multiple end user devices, multiple routers, where at least one is an authorized access point component, and multiple switches. The network has at least one rogue access point detector containing an authorized access point IP address data set. One of the end user devices is an intruder device connected to an unauthorized access point.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods, components, and systems for detecting unauthorized wireless connections to access points and other components in computer networks are described in the various figures. Computer networks often have wired and wireless connections between its components. There are various protocols that may be used to transmit and receive data in a network. One of the most commonly used ones is TCP/IP which is used in the Internet and in other types of networks. The Internet Protocol has a field referred to as Time To Live or TTL. This 8-bit field stores a value that is essentially the upper bound on the time that an IP packet or datagram is allowed to exist on the network. Although this field is referred to as TTL in IP, there may be a similar field in other protocols. For ease of illustration, the TTL field is used to illustrate one embodiment of the present invention. In one embodiment, the TTL field is set by the packet sender, which may be the computer or end device or by the first router or similar network component. Typically, maximum TTL values for end devices connected to the same switch in a network are the same, as described in greater detail below. The maximum TTL value and operations performed on this value by components in a network during transmission of data packets are used to detect potential unauthorized wireless access points.

Figure 1:
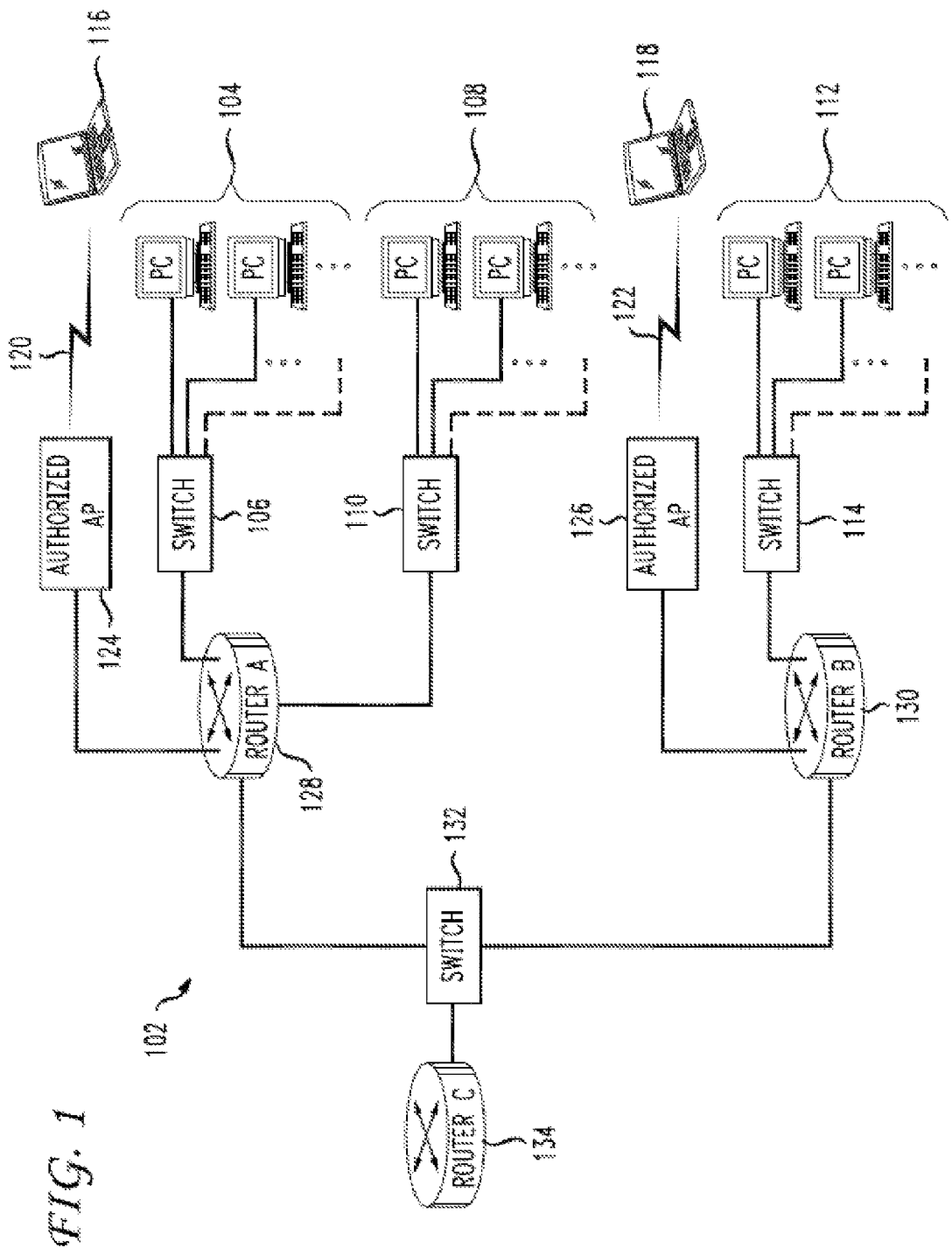
FIG. 1 is a network diagram showing the configuration of end devices and various network components.

FIG. 1 is a network diagram showing the configuration of end devices and various network components. At one end of a network 102 are multiple user devices, in most cases, desktop or laptop computers. One group of computers 104 is connected to a switch 106. Another group of computers 108 is connected to switch 110 and a third group 112 is connected to switch 114. Groups 104, 108, and 112 may be connected in a network, such as in virtual LAN (VLAN) or other type of configuration. Or the only factor grouping the end devices is that they are connected to the same switch (e.g., switches 106, 110 or 114). Also shown in network 102 are two laptop computers 116 and 118 that are connected via wireless connections 120 and 122 to wireless access points or, simply, APs. Laptop 116 is connected to AP 124 and laptop 118 is connected to AP 126. An AP is a special type of router for wireless devices in a network. APs 124 and 126 are authorized APs that are known to network administrators who likely installed them for wireless devices in the network. They are legitimate network components with IP addresses recorded and maintained by network administrators. The configuration shown in FIG. 1 is merely illustrative and is intended to show one network topology. Of course, numerous others are possible and the various embodiments described herein may be applied to other topologies as well. In addition, there may be hundreds or thousands of end user devices, switches, and APs in a network, which may service hundreds of laptop computers or other wireless portable computing devices.

Switches 106 and 110 and AP 124 are connected to a router A 128. Switch 114 and AP 126 are connected to a router B 130. Routers 128 and 130 are, in turn, connected to a switch 132 which is connected to a router C 134. As described below, routers, including wireless APs, perform a specific operation on the value in the TTL field of an incoming packet, namely, subtracting one from the TTL value. This operation on the TTL value is not performed by switches or other network components, such as gateways.

Figure 2:
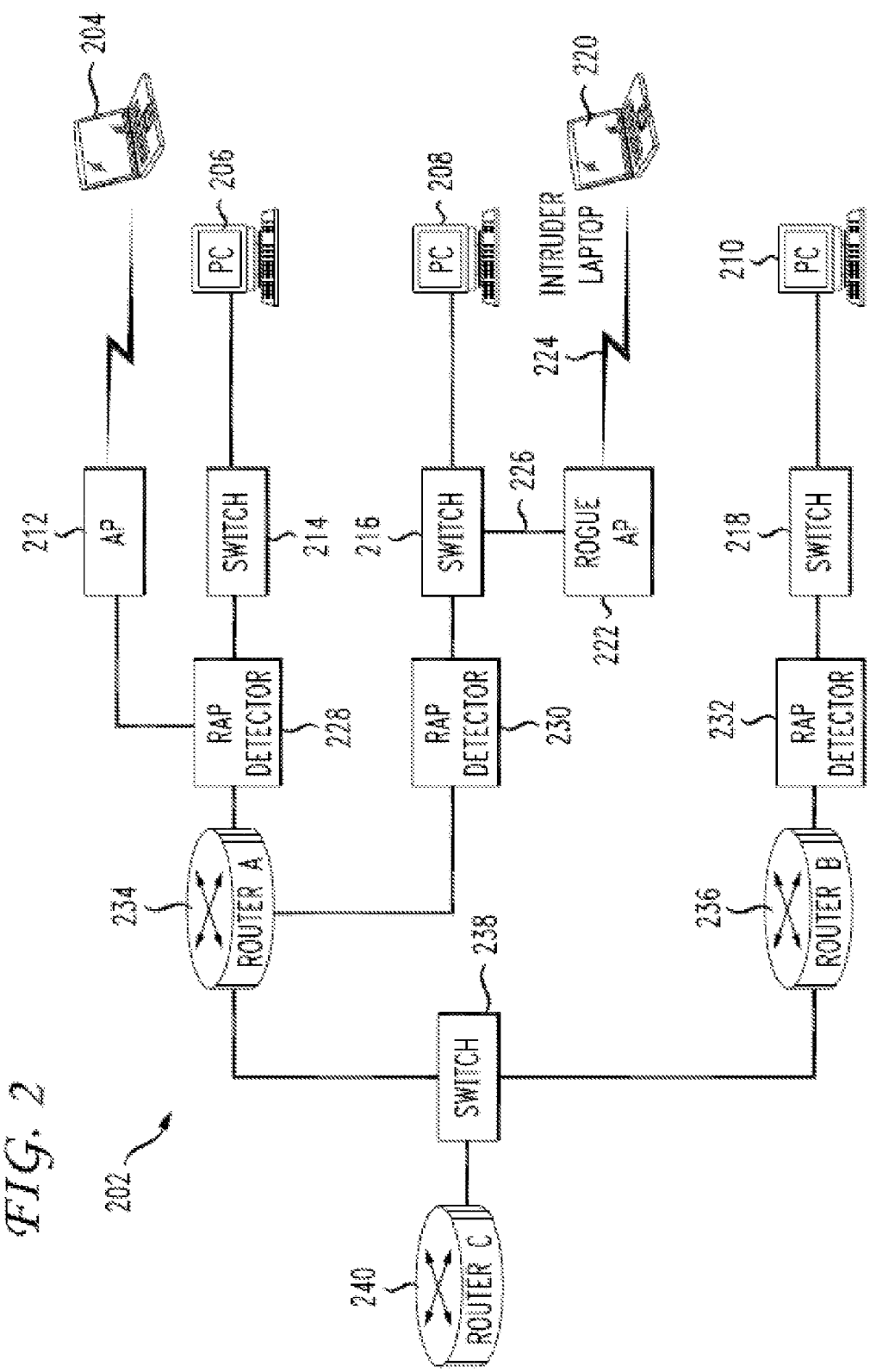
FIG. 2 is a network configuration diagram showing components in a network implementing one embodiment of the present invention.

FIG. 2 is a network configuration diagram showing components in a network implementing one embodiment of the present invention. A network 202 has numerous end user devices, such as laptop computer 204 and PCs 206, 208, and 210. Laptop 204 is connected to wireless AP 212 (as in FIG. 1) and PC 206 is connected to switch 214, PC 208 is connected to switch 216, and PC 210 is connected to switch 218. Also shown in network 202 is an intruder laptop 220 which is connected to an unauthorized or "rogue" AP 222 via a wireless connection 224. Rogue AP 222 is connected to switch 216 via wired connection 226. As described above, rogue AP 222 may be connected to switch 216 without necessarily having to overcome any internal security provisions, such as a secured logon or password protection.

Wireless AP 212 and switch 214 are connected to a rogue AP detector or RAP detector 228. Switch 216 is connected to RAP detector 230 and switch 218 is connected to RAP detector 232. RAP detectors 228 and 230 are connected to router A 234 and RAP detector 232 is connected to router B 236. Routers 234 and 236 are connected to another switch 238 which, in turn, is connected to a router C 240. As noted above with respect to FIG. 1, the network segments shown in these figures are merely segments and are presented to illustrate embodiments of the present invention. They are not intended to show entire or complete network configurations or topologies.

With respect to technical characteristics and operation, rogue AP 222 is essentially the same as authorized AP 212 (or APs 124 and 126 in FIG. 1). Rogue AP 222 does not operate differently, has an IP address, and performs the same operation on an incoming packet TTL value as do the authorized APs. The only significant difference is that the connections between rogue APs and switches or other network components are unauthorized/malicious and that the wireless computing device connected to the rogue AP is not a legitimate end user device in the network. Instead, it is a device operated by a potential intruder who can now obtain information from network 202 or inject malicious code or data into the network.

In one embodiment, RAP detectors are installed between a router and a switch, such as a "core switch" (one that is connected directly to a PC or server computer). A rogue AP, a physical network component, is connected to a switch in the network without having to bypass any security measures. Typically, connecting to a WAP (a specific type of router) to a switch in a network often does not require entering passwords, user names, or any type of login data. Switches may often be kept in network closets or computer rooms that are locked, but once access is gained to these areas, the components themselves often do not have additional security measures. Normally, an AP, legitimate or unauthorized, technically cannot connect to another AP. An intruder's laptop or other device then connects to the unauthorized AP and gains access to the network.

Figure 3:
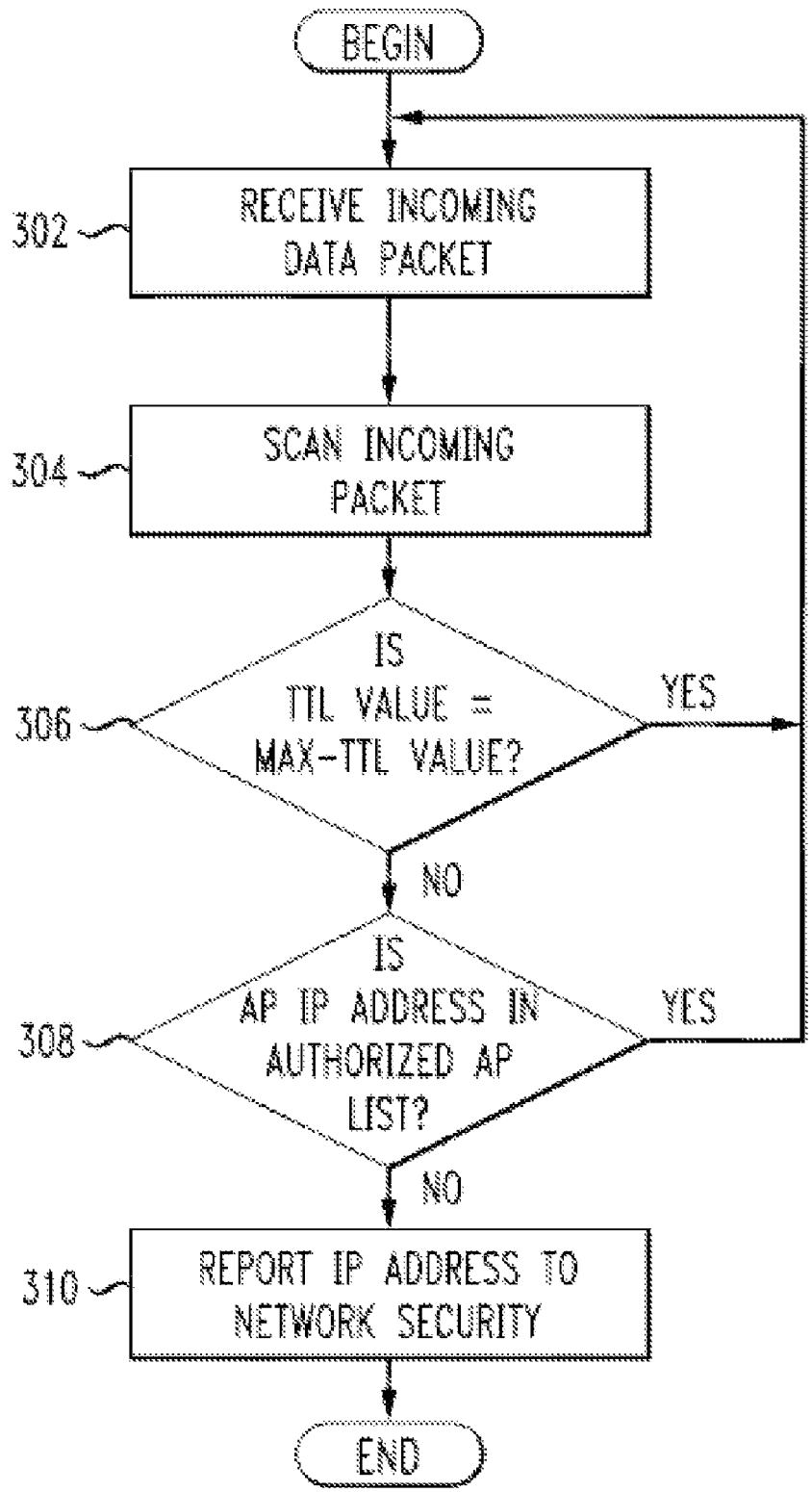
FIG. 3 is a flow diagram showing a process of detecting whether a rogue WAP is being used in a computer network in accordance with specific embodiments.

FIG. 3 is a flow diagram showing a process of detecting whether a rogue WAP is being used in a computer network in accordance with specific embodiments. Not every step provided for such a detection process is necessary, that other steps might be included, and that the order of steps may be rearranged as desired for a given application. At step 302 a rogue AP (RAP) detector receives an incoming data packet via a network interface. A RAP detector is described in FIG. 5. The data packet typically originates from an end user device and may be routed through a switch, such as those shown in FIGS. 1 and 2. In one embodiment, the data packet is formatted according to the Internet Protocol (IP) format and has a field for a TTL value. At step 304 the data packet is scanned or read to determine the TTL value or similar value. In one embodiment this may be done by going directly to the byte position in the IP data frame and reading the 1 byte value. As is known in the art, the TTL value in an IP data frame is an 8-bit field in an IP header. In other embodiments where the data frame is not an IP formatted frame, the packet may be scanned to determine which field is similar or analogous to the TTL field; that is, which field stores data on how long a data packet is permitted to "live" or be transmitted on the Internet or other type of network.

At step 306, in one embodiment, the TTL value is compared to a threshold or maximum TTL value. Methods for deriving a threshold TTL value are described in FIG. 4. A data packet originates from an end user device, such as a PC or laptop, having a value that dictates the amount of "time" that packet may exist in the network. The concept of "time" is measured not by seconds and minutes but rather by the number of relays a packet may go through in a network before it expires. This is to prevent a packet from being transmitted from node to node within a network indefinitely. The TTL value may be thought of as an upper bound on the number of times an IP data frame may be transmitted in a system, which necessarily limits the "time" the frame can exist in a network, for example, on the Internet.

The TTL field is typically set by the packet sender and its value is reduced by one when it passes through a particular type of host, specifically, routers, including wireless APs, and gateways, on route to the packet's destination. Switches and hubs, for example, are not considered to be hosts and thus do not decrement the TTL value or affect it in any manner. It is important to note that authorized and unauthorized wireless APs will decrement the TTL value. An AP does not have to be a legitimate network device, installed and maintained by a network administrator, in order to change a packet's TTL value. Thus, packets originating from intruder laptop 220 will have its TTL value decremented by rogue AP 222 before being transmitted to switch 216.

To illustrate how TTL values are modified in a network, we refer to FIG. 1. Generally, TTL values for packets originating from end user devices within the same network are the same. That is, the TTL values of data packets leaving laptops 116 and 118 and PCs in groups 104, 108, and 112 are the same. To illustrate, this value is referred to as n. The TTL is assigned a value of n is assigned to data packets leaving a PC (for example in group 104) and leaving laptop 116. Following the laptop example, when the data packet reaches AP 124, the TTL value is reduced by one to n−1 and by the time it gets to router A 128, it is reduced to n−2. At router C 134, the TTL value of the data packet leaving laptop 116 is n−3. In contrast, the TTL value of a data packet leaving a PC is deducted by one when it reaches router A 128 and has a value of n−1 and a value of n−2 when it leaves router C 134, as opposed to n−2 and n−3 for laptop 116. As noted above, the reason for the difference in TTL values stems from AP 124 performing as a router and affecting the TTL value for data packets from wireless devices, whereas a switch for wired connections to devices does not affect TTL values. As described below, this difference in TTL value may be used to ascertain wireless connections and a further check using IP addresses of AP devices may be used to determine whether an unauthorized AP is being used.

Returning to the description of step 306, a TTL value of the data packet is compared to a maximum or threshold TTL value. As explained above, TTL values for data packets leaving wired devices, such as PCs, is one value higher than TTL values for packets leaving wireless devices, because those packets must go through a wireless AP. As explained in greater detail below, the maximum TTL value is the TTL value of data packets transmitted from wired devices. It may also be described as the "higher" TTL value as compared to the TTL values from wireless devices. If at step 306, the TTL value in the data packet is the same as the maximum or higher TTL value, it may be assumed that the packet originated from a wired device and nothing further needs to be done with the packet given that only wireless rouge AP components are of concern. Control returns to step 302 where an incoming data packet is received and then scanned at step 304, repeating the process.

If the TTL value is not the same as the maximum TTL value, then control goes to step 308. In the described embodiment, if the TTL value is not the same as the maximum or threshold TTL value, then it is lower, typically by one, as explained above. However, the value may be less by more than one if there are additional routers or APs through which the packet traversed before reaching the RAP detector. In the example above, the "wireless" data packet only traversed one AP before reaching the same router as the "wired" data packet, thus the difference in TTL values was one (i.e., n−1 vs. n−2). At step 308, it is assumed that the packet originated from a wireless device because of the lower TTL value. Thus, the packet was relayed either directly by a wireless AP or indirectly via a switch. In either case, the AP inserts its IP address in the data packet pursuant to the Internet Protocol. Thus, the data packet will contain in its header the IP address of all APs that the data packet has traversed. Because of the positioning of the RAP detector in one embodiment, any "wireless" data packets received by the detector will have been transmitted or relayed by an AP (directly or via a switch), and "wired' packets will have been transmitted by a switch without having to go through an AP. For example, in FIG. 2, RAP detector 228 is positioned between AP 212 and router A 234. It is also positioned between a switch 214 and router A 234. In another example, RAP detector 230 is positioned between rogue AP 222 via switch 216 and router A 234.

Returning to the description of step 308, the AP IP address is read from the data packet header and compared to a list of authorized APs in the network. In one embodiment, any AP IP addresses that may be contained in the data packet header (there may not be if the packet originated from a wired device), may be read or scanned at step 304. Before the process begins, a network security administrator may create a list or data set of IP addresses of authorized or legitimate wireless APs in a network. This list may be stored in a RAP detector and updated when new authorized APs are installed in a network. This list of authorized and legitimate wireless AP IP addresses may be referred to as a "white list." If an AP IP address is on the authorized AP list, then control returns to step 304 where the next data packet is scanned. In this case, it has been determined that the data packet originated from a legitimate wireless device using an authorized AP in the network. If the IP address is not in the authorized data set, control goes to step 310. In this scenario, it is determined that the data packet was routed via an unauthorized or rogue AP and likely originated from an intruder wireless device, such as rogue AP 222 and laptop 220 in FIG. 2.

Figure 4:
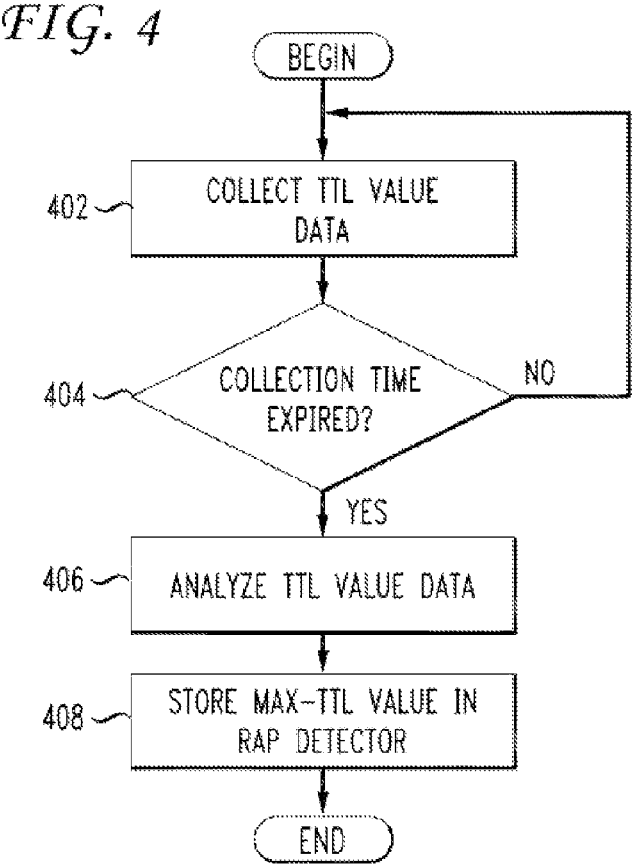
FIG. 4 is a flow diagram of a process of determining a maximum or threshold TTL value in accordance with specific embodiments of the present invention.

FIG. 4 is a flow diagram of a process of determining a maximum or threshold TTL value in accordance with specific embodiments of the present invention. This process may be performed before a RAP detector goes online or begins operation at which stage the value derived from this process, namely, the maximum TTL value (as this term is used above) is stored in the detector. In one embodiment, obtaining the maximum TTL value for one or more wired end user computing devices, such as PCs, is done by examining data over time. While the TTL value is set by the originating computer and is based, in part, on how far the packet is intended to go, generally the TTL values for data packets from computers in the same network are the same. However, in one embodiment, this value still needs to be determined, even if it is the same for all computers in a network or in a network segment, for example, a segment that is covered or under the purview of a specific RAP detector. It is worth noting that in most cases a data packet reaches its destination well before the TTL value gets to zero.

At step 402, TTL value data is collected from computers "downstream" from the RAP detector. For example, in FIG. 2 RAP detector 228 may collect TTL value data from PC 206 and any other PCs that are connected to switch 214 that are not shown (refer to FIG. 1 which shows multiple PCs but does not show the detectors). The data collection may be done by scanning the TTL value field or similar time-expiration field in the data packets from the computers. The data is only read and stored for analysis, described below. At step 404, the RAP detector or other suitable network component determines whether a TTL value data collection time has expired. If it has not, the detector or other component continues to collect TTL value data. A collection time period may depend on several factors, such as the number of computers from which data is being collected and the frequency with which those computers are used. Not all computers from which data may be collected are on at the same time and some may be on for a much shorter period than others. Naturally, with a longer collection time period, more data will be collected and the analysis will likely be more accurate, that is, the maximum TTL value derived may be more accurate. In one embodiment, a time out period may be 24 hours. In other embodiments, it may be 36 hours or 12 hours. If the collection time out period has expired, control goes to step 406.

At step 406 the TTL value data that has been collected is examined and a maximum TTL value is determined. As described above, in many cases the TTL values scanned from the packets originating from the computers being monitored will be the same (e.g., the number n from the example used above). If there is a wide disparity in the values or any difference at all, a network administrator may examine the results to see if a RAP detector will be effective in the given context. At step 408 the maximum TTL value determined at step 406 is stored in the memory of the RAP detector and may be used during operation of the detector, specifically at step 306 of FIG. 3 where the TTL value is compared to the maximum or threshold TTL value. At this stage the process is complete. This process of collecting TTL value data and determining the maximum value may be performed as often as deemed necessary by the network administrator and may be done, for example, when new computers are being added to the network (or to a relevant segment of a network).

Figure 5:
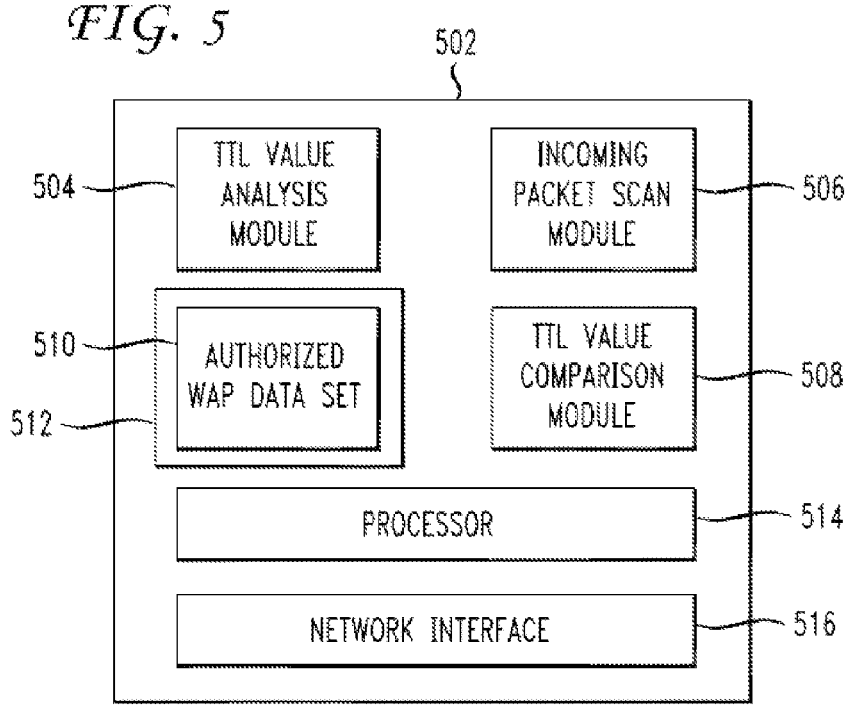
FIG. 5 is a logical block diagram showing internal components of a RAP detector in accordance with specific embodiments of the present invention.

FIG. 5 is a logical block diagram showing internal components of a RAP detector in accordance with specific embodiments of the present invention. In one embodiment, a RAP detector 502 may consist of a TTL value analysis module 504, an incoming data packet scan module 506, and a TTL value comparison module 508. Scan module 506 is used to scan incoming data packets as described in step 304 in FIG. 3. In another embodiment, it may also be used to collect or read TTL value data in data packets as described in step 402. TTL value comparison module 508 contains logic for comparing a scanned TTL value from an incoming data packet to a maximum TTL value as described at step 306.

Also included is an authorized wireless AP data set 510 or "white list" of APs in the network stored in a memory 512 which, in one embodiment, may be a non-volatile type memory. In one embodiment, data set 510 contains IP addresses of authorized APs in the network and is kept current by the network administrator. Computer or network implemented methods may also be used to keep data set 510 current, such as automatic network updates to the data set when the network detects the addition of a new AP. With respect to TTL value analysis module 504, the analysis for determining the maximum TTL value for use in the actual detection process may take place on another suitable component in the network and the TTL value may be transmitted to and stored in the RAP detector. Also included in detector 502 are one or more processors 514 and a network interface 516 for communicating with the network. In some embodiments, there may be fewer or more modules, data sets, and logic than those shown in FIG. 5. For example, there may also be a module or code for examining authorized AP data set 510 to see if the AP IP address from the data packet is contained in the data set. There may also be a reporting module or code for transmitting a message to the network administrator in the event a rogue AP is believed to be detected.

Figure 6:
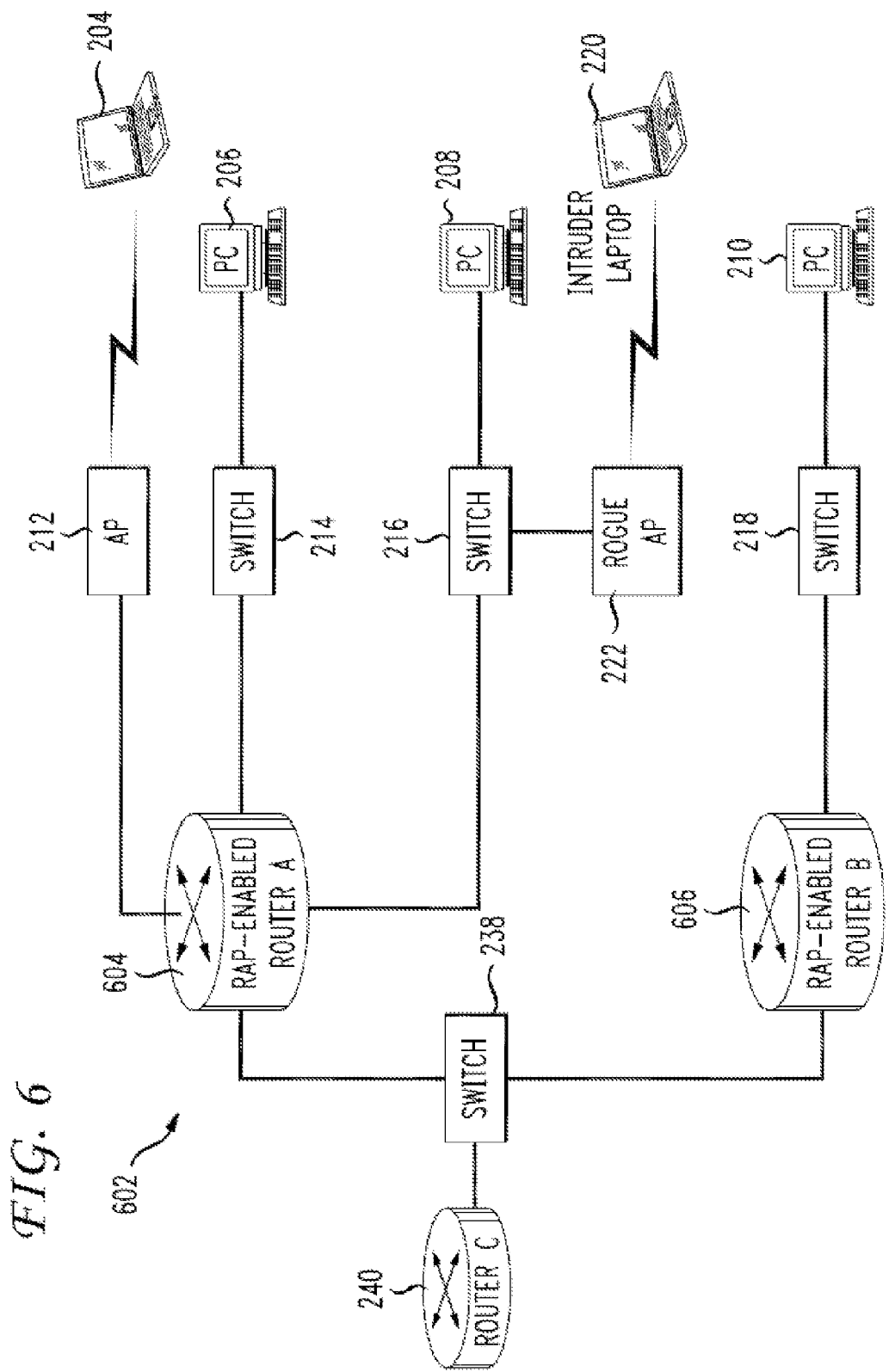
FIG. 6 is a network configuration diagram showing an alternative configuration of the various components, specifically of the RAP detector, that may be used in specific embodiments of the present invention.

FIG. 6 is a network configuration diagram showing an alternative configuration of the various components, specifically of the RAP detector, that may be used in specific embodiments of the present invention. The configuration shown in network 602 has several of the components shown in FIG. 2 and their descriptions are not repeated here. Network 602, however, does not have separate RAP detectors 228 and 230. Instead of having these separate components, RAP detection software is embedded in a pre-existing software package that executes in one embodiment in a router. For example, rogue AP detection software may be bundled with an existing network security software package (e.g., StarGate from Trend Micro) which runs on a router, for example, from Cisco Systems of San Jose, Calif., making the router a "RAP-enabled" router, such as routers 604 and 606. In one embodiment, the detection software executes on the data packet when it is first received by the router and before the router decrements the TTL value in the data packet. In another embodiment, the data packet may be processed by the detection software after the router decrements the TTL value, in which case the logic for step 306 in FIG. 3 is modified accordingly. In another embodiment, RAP detection software is installed and executes on an existing product, such as IGSA from Trend Micro or other network component that operates between a switch and a router, or similar devices.

Figure 7A:
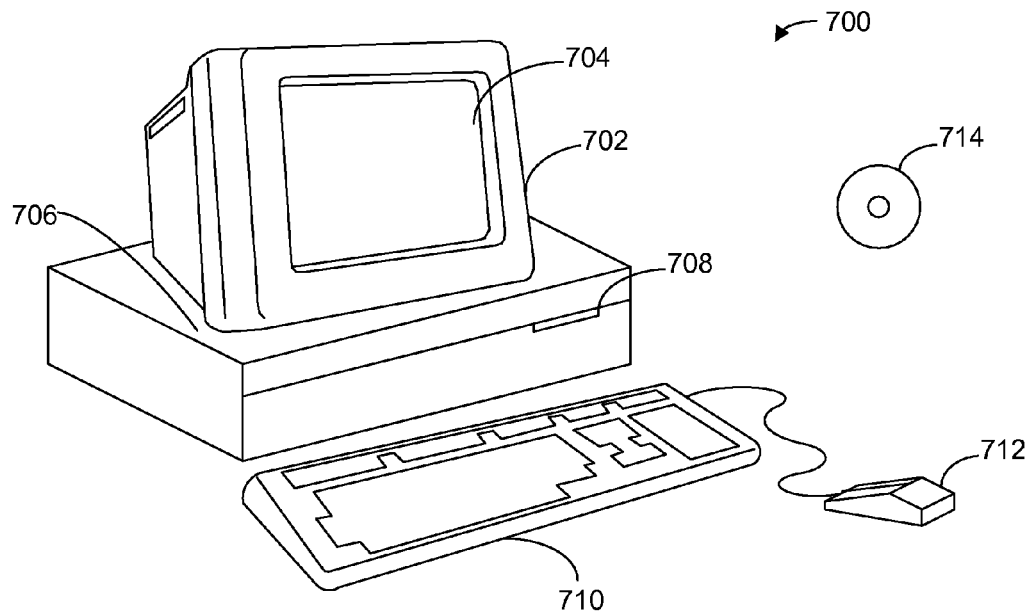
FIGS. 7A and 7B illustrate a computer system suitable for implementing embodiments of the present invention.
Figure 7B:
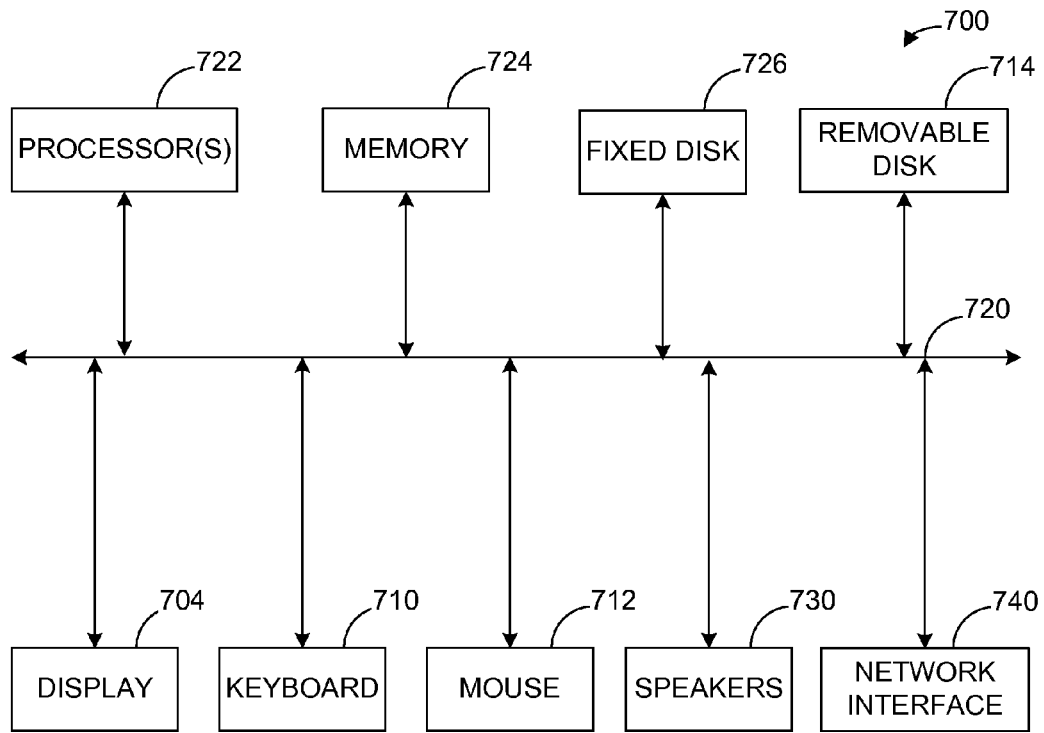

FIGS. 7A and 7B illustrate a computer system 700 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 700 includes a monitor 702, a display 704, a housing 706, a disk drive 708, a keyboard 710 and a mouse 712. Disk 714 is a computer-readable medium used to transfer data to and from computer system 700.

FIG. 7B is an example of a block diagram for computer system 700. Attached to system bus 720 are a wide variety of subsystems. Processor(s) 722 (also referred to as central processing units, or CPUs) are coupled to storage devices including memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 726 is also coupled bi-directionally to CPU 722; it provides additional data storage capacity and may also include any of the computer-readable media described below. Fixed disk 726 may be used to store programs, data and the like and is typically a secondary storage medium (such as a hard disk) that is slower than primary storage. It will be appreciated that the information retained within fixed disk 726, may, in appropriate cases, be incorporated in standard fashion as virtual memory in memory 724. Removable disk 714 may take the form of any of the computer-readable media described below.

CPU 722 is also coupled to a variety of input/output devices such as display 704, keyboard 710, mouse 712 and speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 722 optionally may be coupled to another computer or telecommunications network using network interface 740. With such a network interface, it is contemplated that the CPU might receive information from the network, or might output information to the network in the course of performing the above-described method steps. Furthermore, method embodiments of the present invention may execute solely upon CPU 722 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the embodiments are described using TTL values in the Internet Protocol, other similar time expiration values for a data packet may be used. In another example, while switches are used as the component directly connected to wired end user devices, there may be other types of components in place of switches, such as hubs, servers, and gateways, which may also be present in other parts of the network but are not shown in the figures. Accordingly, the embodiments described are to be considered as illustrative and not restrictive, and the invention is not to be limited to the details given herein, but may be modified within the scope and equivalents of the appended claims.

We claim:

1. A method of detecting an unauthorized wireless access point in a network using a computing device, the method comprising:
    collecting time expiration value data from a plurality of data packets originating from end-user computers of said network;
    analyzing said time expiration value data to obtain a threshold time expiration value, wherein said threshold time expiration value is derived from collecting time expiration value data from said plurality of data packets;
    scanning an incoming data packet for said time expiration value;
    determining whether the time expiration value is the same as a threshold time expiration value;
    when it is determined that the time expiration value is not the same as the threshold time expiration value, determining whether the incoming data packet is being routed through an authorized access point in the network including
        reading an access point IP address from the incoming data packet, and
        determining whether the access point IP address is in an authorized access point IP address data set;
    determining that said access point that is not an authorized access point when said access point IP address is not in said authorized access point IP address data set; and
    reporting to a security component of said network when it is determined that the incoming data packet is not being routed through an authorized access point, wherein the time expiration value is unmodified.

2. A method as recited in claim 1 further comprising:
    receiving the incoming data packet from a switch in the network, the switch being connected to said unauthorized access point.

3. A method as recited in claim 1 further comprising:
    storing the threshold time expiration value in a rogue access point detection component of said network.

4. A method as recited in claim 1 further comprising:
    transmitting notification to a network administrator workstation if the access point IP address is not in the authorized access point address data set.

5. A method as recited in claim 1 further comprising:
    updating the authorized access point IP address data set when one or more authorized access points are added to the network.

6. A method as recited in claim 1 wherein the time expiration value is a Time-To-Live (TTL) value.

7. A wireless access point detection apparatus comprising:
    at least one processor; at least one incoming network interface and at least one outgoing network interface for communication within a computer network;
    a time expiration data collection module that reads time expiration data from a plurality of data packets from end-user devices in said network for a predetermined amount of time;
    a time expiration data analysis module arranged to derive a maximum time expiration value from said time expiration data from said plurality of data packets, wherein the time expiration data analysis module holds said maximum time expiration value for data packets originating from end-user devices in said network;
    a packet scan module for scanning an incoming data packet for a time expiration value;
    a memory storing an authorized wireless access point data set, said data set including IP addresses of authorized access points; and
    a comparison module for comparing the time expiration value scanned from the incoming data packet with the maximum time expiration value, for determining whether an access point is authorized using said authorized access point data set, and for reporting to a security component of said network when it is determined that the incoming data packet is not being routed through an authorized access point, wherein the time expiration value is unmodified.

8. A wireless access point detection component as recited in claim 7 further comprising:
    a reporting module for reporting an unauthorized access point to a network administrator workstation.

9. A computer network apparatus comprising:
    a plurality of end user devices, wherein one of the end user devices is an intruder device connected to an unauthorized access point;
    a plurality of routers, wherein at least one of said routers is an authorized access point component;
    a plurality of switches;
    a time expiration data collection module that reads time expiration data from a plurality of data packets from said end-user devices in said network for a predetermined amount of time and determines a maximum time expiration value from said time expiration data from said plurality of data packets; and
    at least one rogue access point detector containing an authorized access point IP address data set, wherein the at least one rogue access point detector is arranged to examine a time-to-live (TTL) value of a data packet traversing the network, compare said (TTL) value to said maximum time expiration value, utilize the authorized access point IP address data set to detect the unauthorized access point, and to report to a security component of said network when it is determined that said data packet is not being routed through an authorized access point, wherein the TTL value is unmodified.

10. A computer network as recited in claim 9 wherein the at least one rogue access point detector is implemented in a router, thereby creating a rogue access point detection-enabled router.

11. A computer network as recited in claim 9 wherein the at least one rogue access point detector is implemented in an existing network security component.

12. A computer network as recited in claim 9 wherein the unauthorized access point is connected to a switch from the plurality of switches.

* * * * *